United States Patent [19]
Nishina et al.

[11] Patent Number: 6,039,296
[45] Date of Patent: *Mar. 21, 2000

[54] BEVERAGE CONTAINER HOLDER FOR A VEHICLE

[75] Inventors: Yuji Nishina, Wako; Toshihide Kimisawa, Yokohama, both of Japan

[73] Assignees: Honda Giken Kogyo Kabushiki Kaisha, Tokyo; Nifco Inc., Kanagawa-ken, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/891,566

[22] Filed: Jul. 10, 1997

[30] Foreign Application Priority Data

Jul. 10, 1996 [JP] Japan ................................. 8-198502

[51] Int. Cl.⁷ ........................................... A47K 1/08
[52] U.S. Cl. .................. 248/311.2; 224/926; 297/188.14
[58] Field of Search ................................ 248/311.2, 313, 248/316.5; 224/926; 297/188.14, 188.15, 188.16, 188.17, 188.19

[56] References Cited

U.S. PATENT DOCUMENTS

| | | |
|---|---|---|
| 4,848,627 | 7/1989 | Maeda et al. .................... 248/311.2 X |
| 4,927,108 | 5/1990 | Blazic et al. ......................... 248/311.2 |
| 5,170,980 | 12/1992 | Burrows et al. ..................... 248/311.2 |
| 5,246,151 | 9/1993 | Jabara .............................. 248/205.2 X |
| 5,490,653 | 2/1996 | Ingwersen ............................ 248/311.2 |
| 5,520,313 | 5/1996 | Toshihide ......................... 248/311.2 X |
| 5,562,331 | 10/1996 | Spykerman et al. ............... 297/188.16 |
| 5,620,122 | 4/1997 | Tanaka ................................ 224/926 X |
| 5,702,041 | 12/1997 | Sun et al. ......................... 248/311.2 X |
| 5,720,514 | 2/1998 | Carlsen et al. ....................... 297/188.1 |

Primary Examiner—Derek J. Berger
Attorney, Agent, or Firm—Skjerven, Morrill MacPherson, Franklin & Friel LLP; David E. Steuber

[57] ABSTRACT

In a beverage container holder for a vehicle comprising a box-like member, a first holding member, and a second holding member, the box-like member comprises a floor and generally upstanding walls defining a compartment with an opening on its top, the first holding member extends across the opening of the box-like member and divides the compartment into two parts, and the second holding member is mounted to the first holding member and moveable between a relatively retracted position and a relatively extended position. Preferably the second holding member is pivotally connected to the first holding member so as to be rotatable between the relatively retracted and extended positions. This beverage container holder can be readily adjustable for receiving and holding beverage containers of various sizes by rotating the second holding member between the relatively retracted and extended positions.

25 Claims, 4 Drawing Sheets

BEVERAGE CONTAINER HOLDER FOR A VEHICLE

TECHNICAL FIELD

The present invention relates to beverage container holders for vehicles for holding beverage containers, and in particular to beverage container holders which are readily adjustable to hold beverage containers of different sizes.

BACKGROUND OF THE INVENTION

As is known, beverage containers such as cans and paper-cups of various sizes are commonly used, and they may vary in diameter substantially. Therefore, it is desirable that beverage container holders for vehicles are easily adjustable so as to suitably receive and support such beverage containers of various sizes.

Japanese utility model publication No. 3-31621 discloses one example of such adjustable beverage container holders in which a box-like member defining a compartment having an open top in the center console of the vehicle is equipped with a slidable member which extends across a rectangular-shaped opening of the compartment and which is slidable along a pair of opposing edges of the rectangular opening such that the opening size can be adjustable by changing the position of the slidable member depending on the size (or diameter) of the beverage container to be held therein. In this beverage container holder, it is required to adjust the position of the slidable member every time a beverage container of a different size is desired to be held in the container holder. However, the adjusting operation of the slidable member is not as easy and smooth as is desired. Further, when required to hold two beverage containers, the conventional beverage container holder must have two slidable members which require separate adjusting operations.

BRIEF SUMMARY OF THE INVENTION

In view of such problems of the prior art, a primary object of the present invention is to provide a beverage container holder for a vehicle which can suitably receive and support beverage containers of different sizes with an easy and comfortable adjusting operation.

A second object of the present invention is to provide such a beverage container holder as a simple mechanism and for a reasonable cost.

To achieve the above objects, the present invention provides a beverage container holder for a vehicle comprising: a box-like member having a floor and generally upstanding walls defining a compartment with an opening on its top; a first holding member which extends across the opening of the box-like member and divides the compartment into two parts; and a second holding member which is mounted to the first holding member and moveable between a relatively retracted position and a relatively extended position.

In one preferred embodiment of the present invention, the second holding member is pivotally mounted to the first holding member so as to be rotatable between the relatively retracted and extended positions. More preferably, a generally upwardly extending knob member is securely attached to the second holding member so that the second holding member can be rotated between the relatively retracted and extended positions by rotating the knob member. Further, the first and second holding members are preferably connected by a spring means which urges the second holding member toward its relatively retracted position when the second holding member is in the relatively retracted position, and urges the second holding member toward its relatively extended position when the second holding member is in the relatively extended position. It is further preferable that the second holding member is designed such that it is hidden from view by the first holding member when in the relatively retracted position. Moreover, the first or second holding member has first arcuate edges adapted for supporting a beverage container when the second holding member is in its relatively retracted position and portions of the second holding member which protrude into the two parts of the compartment when the second holding member is in the relatively extended position have second arcuate edges for supporting a beverage container, the second arcuate edges having a smaller radius of curvature than the first arcuate edges. More preferably, a center of curvature of at least one of the second arcuate edges of the second holding member are laterally offset from a longitudinal axis of the box-like member so that a relatively small beverage container can be stably held in a corner of the box-like member.

In this manner, the beverage container holder can be readily adjustable for receiving and holding beverage containers of various sizes by moving the second holding member between the relatively retracted position in which the second holding member is preferably substantially hidden from view by the first holding member and the relatively extended position in which portions of the second holding member protrude into the two parts of the compartment of the box-like member.

Other and further objects, features and advantages of the invention will appear more fully from the following description.

BRIEF DESCRIPTION OF THE DRAWINGS

Now the present invention is described in the following with reference to the a ended drawings, in which.

DETAILED DESCRIPTION OF THE PREFERRED EMBODIMENTS

Figure 1:
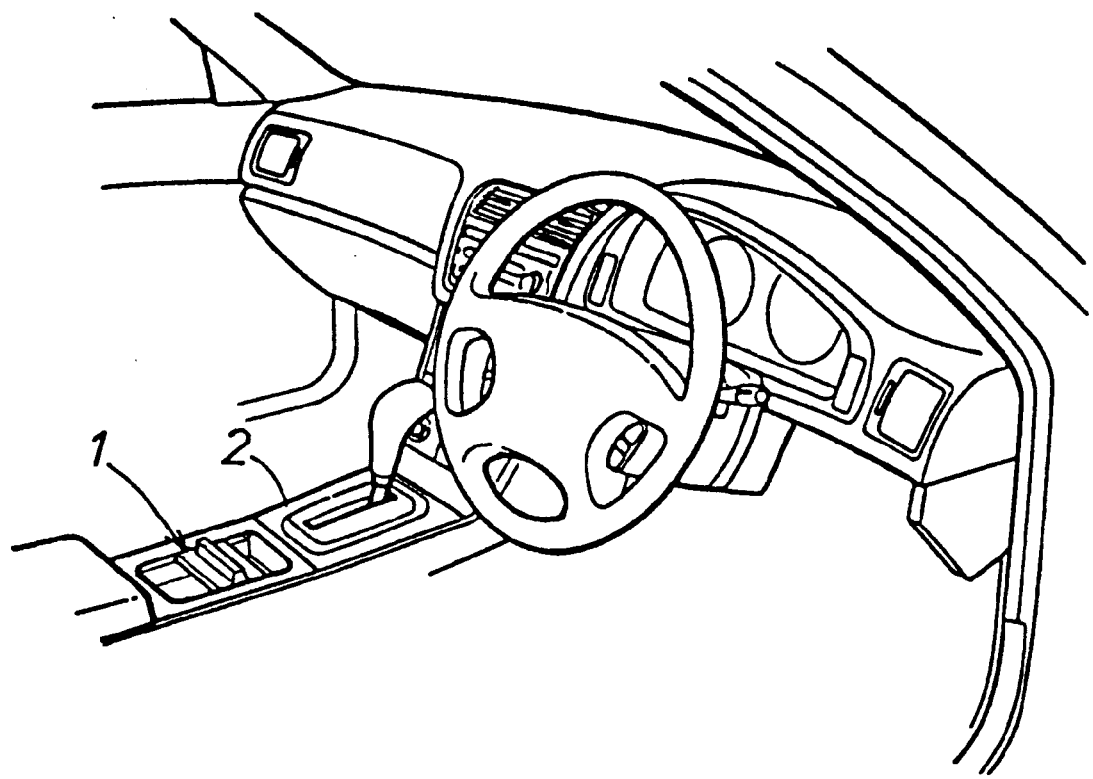
FIG. 1 is a fragmentary perspective view of a vehicle including a beverage container holder according to the present invention.

Referring to FIG. 1, a beverage container holder 1 according to the present invention is shown mounted in the center console 2 of the vehicle. As shown in detail in FIGS. 2 and 3, the beverage container holder 1 comprises a generally rectangular box-like member 3 defining a compartment having an opening on its top, and a first holding member 5 extending across the opening of the box-like member 3. As shown in detail below, the first holding member 5 has two protrusions 17 on both its sides slideably fitted in a pair of guide grooves 4 which are formed in the inwardly facing surfaces of the opposing upstanding walls of the box-like member 3 and extend along the longitudinal edges of these walls. In this embodiment, the longitudinal axis of the beverage container holder 1 extends along the longitudinal axis of the vehicle. Main component parts of the beverage container holder 1 are preferably made of plastic.

Figure 2:
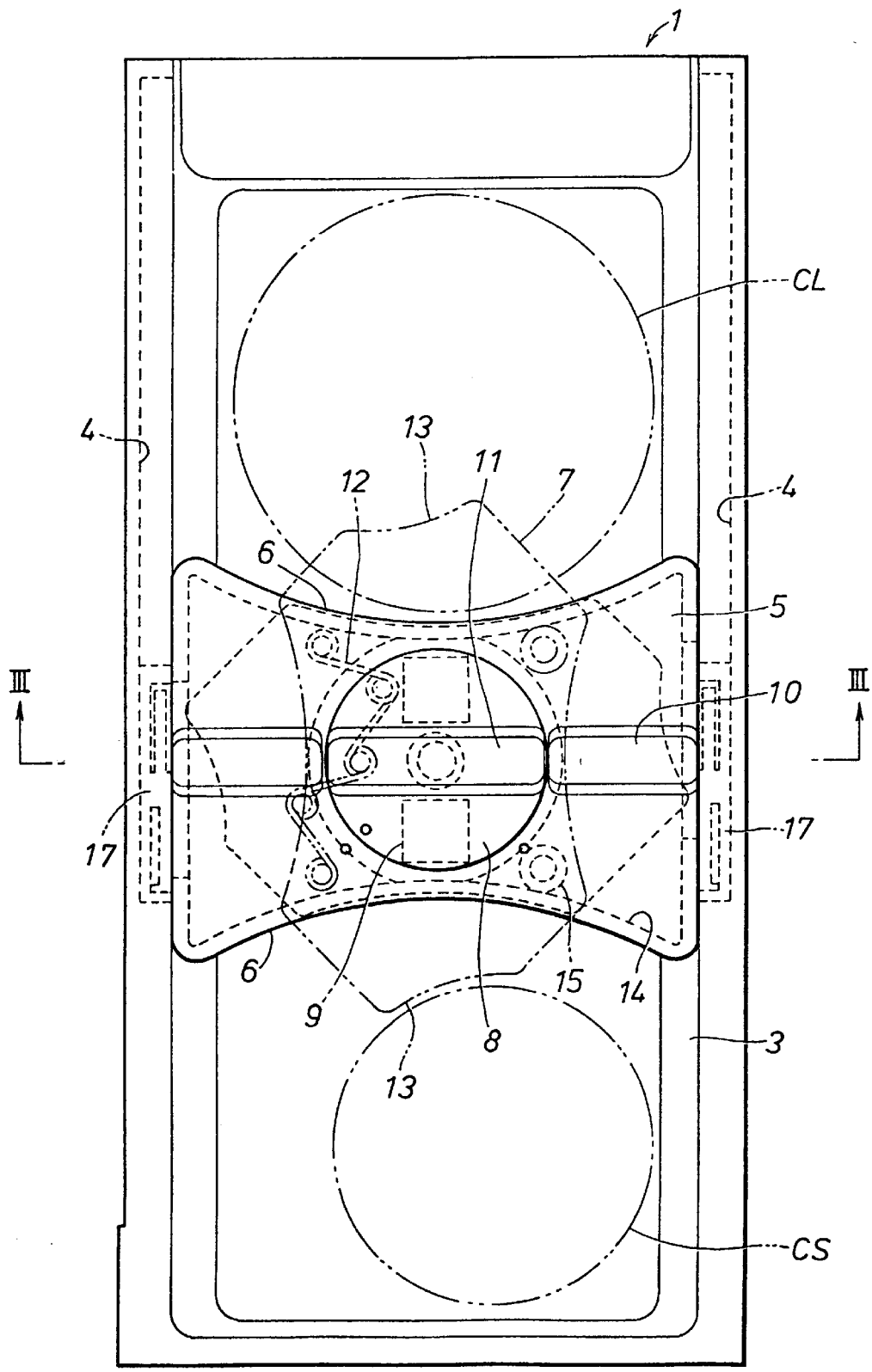
FIG. 2 is a plan view of the beverage container holder according to the present invention.

The first holding member 5 is slideably movable along the longitudinal axis of the box-like member 3 so that the first holding member 5 can move between a use position for holding beverage containers which is generally at the longitudinal center of the box-like member 3 and a non-use position adjacent the front or rear wall of the box-like member 3 at which the compartment defined by the box-like member 3 can be effectively used for placing things other than beverage containers, such as cassette tapes, magazines, snacks and others. In the use position, the first holding member 5 divides the compartment into two parts, i.e., defines two spaces on the front and rear sides thereof between the front and rear walls of the box-like member 3 such that each of the spaces is adapted for receiving and supporting a single beverage container CL of relatively large size. As shown in FIG. 2, the front and rear edges 6 of the first holding member 5 have an arcuate shape adapted for effectively holding a relatively large beverage container CL.

A second holding member 7 is pivotally mounted to the first holding member 5. In this embodiment, the second holding member 7 is placed under the first holding member 5 such that the second holding member 7 is substantially hidden from view by the first holding member 5 when in a retracted position as shown by a dotted line in FIG. 2. It should be understood that when in the retracted position, the second holding member 7 does not have to be completely hidden under the first holding member 5 as shown in this embodiment but may slightly protrude from the edges 6 of the first holding member 5 as long as the two parts of the compartment maintain enough room for receiving and holding relatively large beverage containers, although the configuration in which the second holding member 7 is hidden from view by the first holding member 5 when in the retracted position may be aesthetically preferable.

Figure 3:
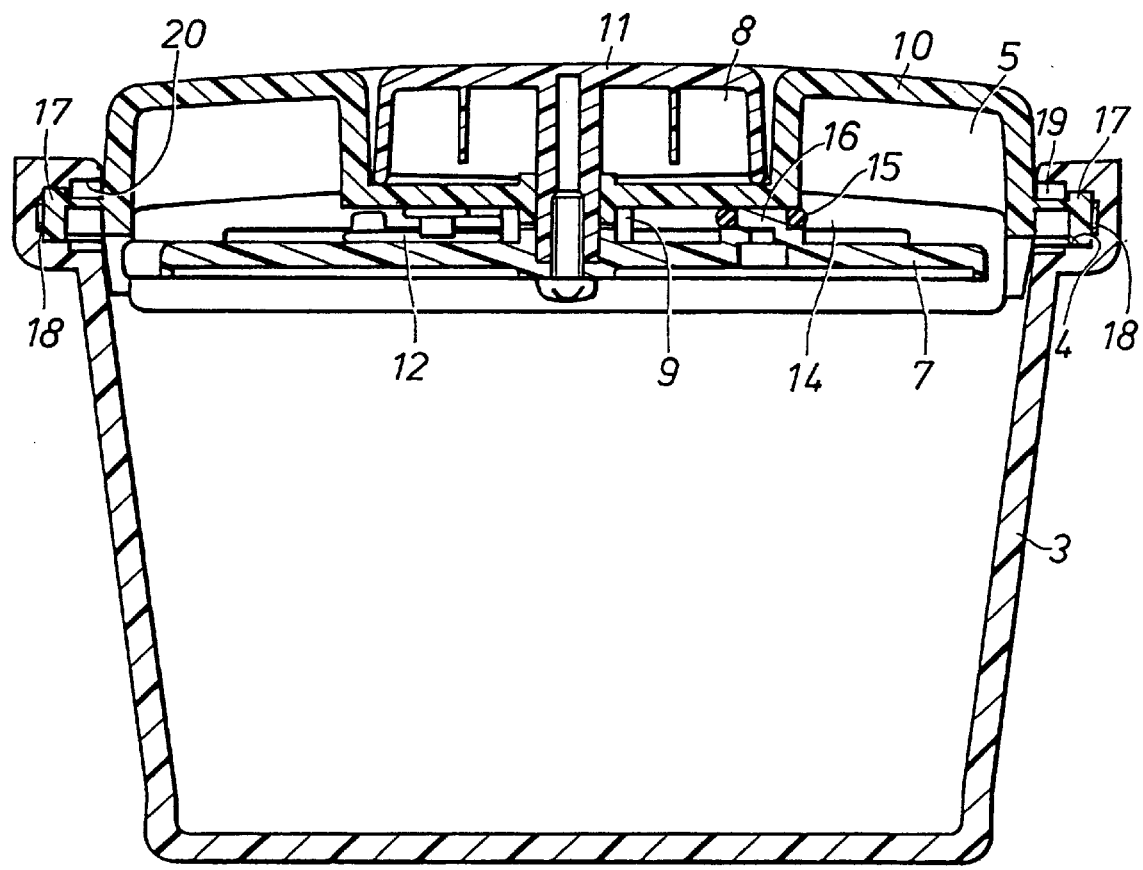
FIG. 3 is cross sectional view taken along the line III—III in FIG. 2.

A knob member 8 having a generally rectangular handle 11 extending upwardly above the first holding member 5 is securely attached to the second holding member 7 as clearly shown in FIG. 3 such that by rotating the handle 11 by 90 degrees, the second holding member 7 is moved to its extended position in which portions of the second holding member 7 protrude outwardly from the front and rear arcuate edges 6 of the first holding member 5 as also shown in FIG. 2 by a line consisting of dots and short line segments. Felt pieces 9 are provided between the bottom surface of the first holding member 5 and the upper surface of the second holding member 7 to improve the smoothness and stability of the relative rotating movement between these holding members.

Extending upwardly from the upper surface of the first holding member 5, two handles 10 used in sliding the first holding member 5 along the guide grooves 4 are provided on both left and right sides of the handle 11 in the manner that the handles 10 and the handle 11 make an apparently unitary handle when the second holding member 7 is in its retracted position.

The first and second holding members 5, 7 are connected by a generally L-shaped reversible spring 12. When the second holding member 7 is in its retracted position, the spring 12 urges it toward the retracted position. However, the spring 12 is designed such that the direction of its biasing force is changed at a point between the retracted and extended positions of the second holding member 7 so that when the second holding member 7 is in its extended position, the spring 12 biases it toward the extended position. This allows the second holding member 7 to be stably retained in both retracted and extended positions, and also contributes to a comfortable adjusting operation of the beverage container holder 1.

The portions of the second holding member 7 which protrude from the arcuate edges 6 of the first holding member 5 into the two parts or the compartment when the second holding member 7 is in its extended position also have arcuate edges 13 which have a smaller radius of curvature than the arcuate edges 6 of the first holding member 5. These arcuate edges 13 are adapted to suitably hold a relatively small beverage container CS in the spaces they define in cooperation with the floor and upstanding walls of the box-like member 3. In this embodiment, the center of curvature of each arcuate edge 13 is laterally offset from the longitudinal axis of the box-like member 3 so that a relatively small beverage container CS can be stably held in a corner of the box-like member 3, i.e., the side of a relatively small beverage container CS is supported by the edge 13 and two upstanding walls forming a corner of the box-like member 3.

The front and rear arcuate edges 6 of the first holding member 5 include downwardly elongating ribs 14, and the upper surface of the second holding member 7 includes an upwardly oriented pin-like protrusion 16, preferably with an O-ring 15 fitting on the protrusion 16. This protrusion 16 limits the rotation of the second holding member 7 by abuttingly engaging the front and rear ribs 14 of the first holding member 5, and therefore determines the extended and retracted positions of the second holding member 7. The O-ring 15 works to absorb shock and noise generated when the protrusion 16 abuts the ribs 14.

Figure 4:
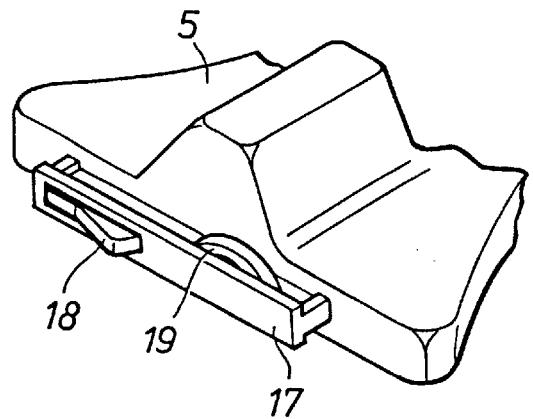
FIG. 4 is fragmentary perspective view of a first holding member of the be rage container holder according to the present invention.

As shown in detail in FIG. 4, the first holding member 5 includes guiding protrusions 17 which extend from both sides of the first holding member 5 and which are slideably received by the guide grooves 4 formed in the box-like member 3. More specifically, each of the guiding protrusions 17 is equipped with a support member 18 on its outwardly facing surface, the support member 18 being formed of an elastic material or being biased outwardly for pressingly engaging the inwardly facing surface of the corresponding guide groove 4 to prevent lateral rattling of the first holding member 5. Also, each of the guiding protrusions 17 includes arcuately shaped support member 19 on its upper surface, the arcuately shaped support member 19 also being formed of an elastic material or being upwardly biased for pressingly engaging the downwardly facing surface of the corresponding guide groove 4 such that vertical rattling of the first holding member 5 is prevented. These arcuately shaped support members 19 can be provided on the bottom surfaces of the guiding protrusions 17. Thus these support members 18, 19 serve to prevent rattling of the first holding member 5, achieving a smooth sliding movement of the holding member 5.

Figure 5:
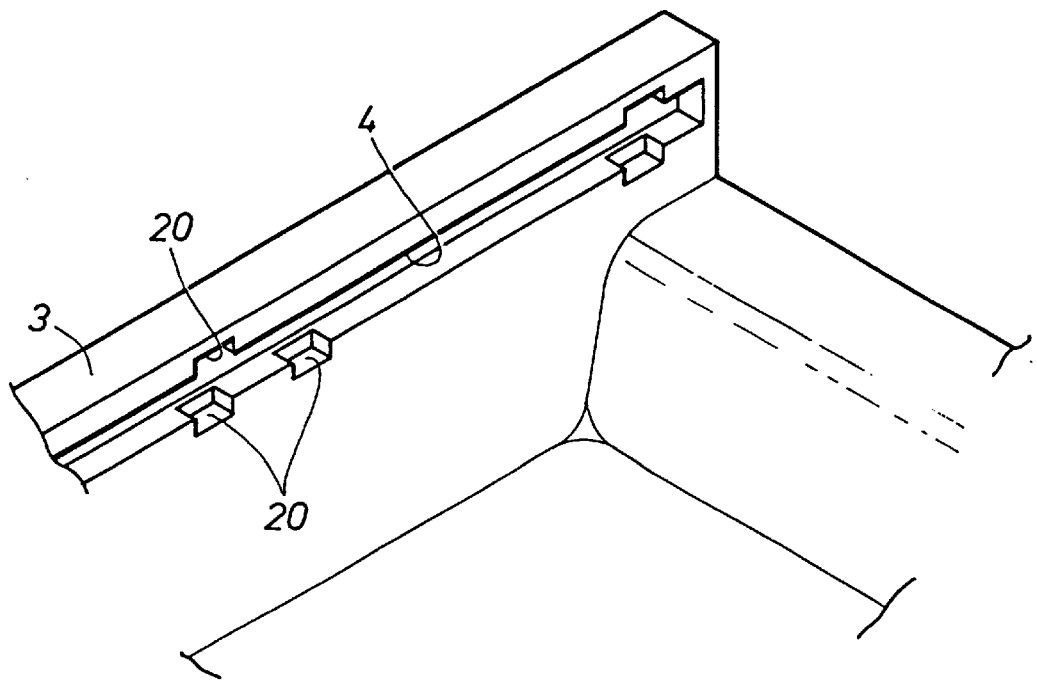
FIG. 5 is a fragmentary perspective view of a guide groove of the beverage container holder according to the present invention.

Referring to FIG. 5, each of the guide grooves 4 includes on its downwardly facing surface and/or on its upwardly facing surface at least one detents or depressions 20 for receiving the corresponding arcuately shaped support members 19 such that the driver or a passenger can easily find a suitable position of the first holding member 5 for holding beverage containers and the suitable position is sufficiently stably maintained while the vehicle is traveling.

These depressions 20 may be formed on both downwardly facing and upwardly facing surfaces of the guide grooves 4 at several longitudinal positions adapted for a variety of uses of the compartment defined by the box-like member 3.

In the above described embodiment, the box-like member 3 has a rectangular shape. However the present invention is not limited to this embodiment and the box-like member 3 can have other shapes such as a square.

Thus, according to the present invention, a beverage container holder for a vehicle is provided comprising a box-like member, a first holding member and a second holding member, in which the beverage container holder can be readily adjustable for receiving and holding beverage containers of various sizes by moving the second holding member between a relatively retracted position and a relatively extended position.

Although the present invention has been described in terms of specific embodiments thereof, it is possible to modify and alter details thereof without departing from the spirit of the present invention.

What we claim is:

1. A beverage container holder for a vehicle comprising:
   a beverage container holding unit having a floor and generally upstanding walls defining a compartment with a rectangular opening on its top;
   a first holding member which extends across the opening of the beverage container holding unit and divides the compartment into two parts,
   a second holding member which is mounted to the first holding member and moveable between a relatively retracted position and a relatively extended position, in which the second holding member protrudes laterally outwardly from the first holding member wherein when in the relatively retracted position, the second holding member defines a first container opening adapted to hold a relatively large beverage container, and when in the relatively extended position, the second holding member defines a second container opening smaller than the first container opening, the second container opening adapted to hold a relatively small beverage container that is smaller in diameter relative to the relatively large beverage container by creating a smaller cross-sectional area of the second container opening into which the relatively large beverage container no longer is able to be inserted.

2. A beverage container holder according to claim 1, wherein a generally upwardly extending knob member is securely attached to the second holding member so that the second holding member can be rotated between the relatively retracted and extended positions by rotating the knob member.

3. A beverage container holder according to claim 1, wherein the second holding member is hidden from view by the first holding member when in the relatively retracted position.

4. A beverage container holder according to claim 1 wherein the first holding member is longitudinally slideably mounted to the beverage container holding unit.

5. A beverage container holder according to claim 4 wherein the generally upstanding walls comprise a pair of opposing generally upstanding walls having a longitudinal edge and a pair of guide grooves which are formed in inwardly facing surfaces of the pair of generally upstanding walls and extend along the longitudinal edges of the walls, and the first holding member comprises sides adapted to be slideably received in the pair of guide grooves of the beverage container holding unit.

6. A beverage container holder for a vehicle comprising:
   a beverage container holding unit having a floor and generally upstanding walls defining a compartment with an opening on its top;
   a first holding member which extends across the opening of the beverage container holding unit and divides the compartment into two parts; and
   a second holding member which is pivotally mounted to the first holding member so as to be rotatable between a relatively retracted position and a relatively extended position, wherein the first and second holding members are connected by a spring which urges the second holding member toward its relatively retracted position when the second holding member is in the relatively retracted position, and urges the second holding member toward its relatively extended position when the second holding member is in the relatively extended position.

7. A beverage container holder for a vehicle comprising:
   a beverage container holding unit having a floor and generally upstanding walls defining a compartment with a rectangular opening on its top;
   a first holding member which extends across the opening of the beverage container holding unit and divides the compartment into two parts; and
   a second holding member which is mounted to the first holding member and moveable between a relatively retracted position and a relatively extended position, wherein the first or second holding member has first arcuate edges adapted for supporting a relatively large beverage container when the second holding member is in the relatively retracted position, and wherein portions of the second holding member protrude into the two parts of the compartment when the second holding member is in the relatively extended position, the portions having second arcuate edges for supporting a relatively small beverage container when in the relatively extended position, the second arcuate edges having a smaller radius of curvature than the first arcuate edges, the relatively small beverage container being small relative to the relatively large beverage container.

8. A beverage container holder according to claim 7, wherein a center of curvature of at least one of the second arcuate edges of the second holding member are laterally offset from a longitudinal axis of the beverage container holding unit so that the relatively small beverage container can be stably held in a corner of the beverage container holding unit.

9. A beverage container holder for a vehicle comprising:
   a beverage container holding unit having a floor and generally upstanding walls defining a compartment with an opening on its top, the generally upstanding walls comprising a pair of opposing generally upstanding parallel walls having a longitudinal edge;
   a first holding member which extends across the opening of the beverage container holding unit and divides the compartment into two parts; and
   a second holding member which is rotatably mounted to the first holding member and rotatable about an axis generally perpendicular to the plane of the opening in the top, between a relatively retracted position and a relatively extended position, wherein when in the relatively retracted position, the second holding member defines a first container opening adapted to hold a relatively large beverage container, and when in the relatively extended position, the second holding member defines a second container opening smaller than the first container opening, the second container opening adapted to hold a relatively small beverage container that is small relative to the relatively large beverage container.

10. A beverage container holder according to claim 9, wherein a generally upwardly extending knob member is securely attached to the second holding member so that the second holding member can be rotated between the relatively retracted and extended positions by rotating the knob member, the knob member being rotatable about the axis.

11. A beverage container holder according to claim 9, wherein the second holding member has an upper surface parallel to a lower surface of the first holding member, wherein the lower surface of the first holding member entirely overlies the upper surface of the second holding member when in the relatively retracted position.

12. A beverage container holder according to claim 9, wherein the first holding member is longitudinally slideably mounted to the beverage container holding unit.

13. A beverage container holder according to claim 9, further comprising a pair of guide grooves that are formed in an inwardly facing surface of each of the pair of generally upstanding parallel walls and extend along the longitudinal edges of the respective wall, the first holding member comprising sides adapted to be slideably received in the pair of guide grooves of the beverage container holder unit.

14. A beverage container holder for a vehicle comprising:
a beverage container holding unit having a floor and generally upstanding walls defining a compartment with an opening on its top, the generally upstanding walls comprising a pair of opposing generally upstanding parallel walls having a longitudinal edge;
a first holding member which extends across the opening of the beverage container holding unit and divides the compartment into two parts; and
a second holding member which is mounted to the first holding member and moveable between a relatively retracted position and a relatively extended position, wherein the first or second holding member has first arcuate edges adapted for supporting a relatively large beverage container when the second holding member is in its relatively retracted position; and wherein portions of the second holding member, ehich protrude into the two parts of the compartment when the second holding member is in the relatively extended position, have second arcuate edges for supporting a relatively small beverage container, the second arcuate edges having a smaller radius of curvature than the first arcuate edges, the relatively large beverage container being larger relative to the relatively small beverage container.

15. A beverage container holder according to claim 14, wherein a center of curvature of at least one of the second arcuate edges of the second holding member is laterally offset from a longitudinal axis of the beverage container holding unit so that the relatively small beverage container can be stably held in a comer of the beverage container holding unit.

16. A beverage container holder for a vehicle comprising:
a beverage container holding unit having a floor and generally upstanding walls defining a compartment with a rectangular or square opening on its top;
a first holding member which extends across the opening of the beverage container holding unit and divides the compartment into two parts;
a second holding member which is mounted to the first holding member and moveable between a relatively retracted position and a relatively extended position, wherein when in the relatively retracted position, the second holding member defines a first container opening adapted to hold a relatively large beverage container, and when in the relatively extended position, the second holding member defines a second container opening smaller than the first opening, the second container opening adapted to hold a relatively small beverage container that is small relative to the relatively large beverage container; and
wherein the first and second holding members are connected by a spring which urges the second holding member toward its relatively retracted position when the second holding member is in the relatively retracted position, and urges the second holding member toward its relatively extended position when the second holding member is in the relatively extended position.

17. A beverage container holder for a vehicle comprising:
a beverage container holding unit having a floor and generally upstanding walls defining a compartment with an opening across its top;
a first holding member which extends across the opening of the beverage container holding unit and divides the compartment into two parts; and
a second holding member which is rotatively mounted to the first holding member and rotatively moveable about an axis generally perpendicular to the plane of the opening across the top of the compartment between a relatively retracted position and a relatively extended position, wherein the second holding member is shaped such that when in the relatively retracted position the second holding member and the first holding member define a first container opening adapted to hold a relatively large beverage container, and when in the relatively extended position, the second holding member, by its extension into at least one of the two parts of the compartment, with a plane of rotation of the second holding member lying in a plane generally parallel to the plane of the opening across the top, defines a second container opening smaller than the first container opening, the second container opening adapted to hold a smaller beverage container that is smaller relative to the relatively large beverage container.

18. A beverage container holder according to claim 17, wherein a generally upwardly extending knob member is securely attached to the second holding member so that the second holding member can be rotated between the relatively retracted and extended positions by rotating the knob member.

19. A beverage container holder according to claim 17, wherein the second holding member is hidden from view by the first holding member when in the relatively retracted position.

20. A beverage container holder according to claim 17 wherein a center of curvature of at least one of the second arcuate edges of the second holding member is laterally offset from a longitudinal axis of the beverage container holding unit when the second holding member is in the relatively extended position so that the relatively small beverage container can be stably held in a comer of the beverage container holding unit.

21. A beverage container holder according to claim 17 wherein the first holding member is longitudinally slideably mounted to the beverage container holding unit.

22. A beverage container holder according to claim 17 wherein the generally upstanding walls comprise a pair of opposing generally upstanding walls having a longitudinal edge and a pair of guide grooves which are formed in an inwardly facing surface of each of the pair of generally upstanding walls and extend along the longitudinal edges of the respective wall, and the first holding member comprises sides adapted to be slideably received in the pair of guide grooves of the beverage container holding unit.

23. A beverage container holder for a vehicle comprising:

a beverage container holding unit having generally upstanding walls defining a compartment with an opening across its top;

a first holding member which extends across the opening across the top of the beverage container holding unit and divides the compartment into two parts; and a second holding member which is rotatively mounted to the first holding member and rotatively moveable about an axis generally perpendicular to the plane of the opening across the top of the compartment between a relatively retracted position and a relatively extended position, wherein the second holding member is shaped such that when in the relatively retracted position the second holding member and the first holding member define a first container opening adapted to hold a relatively large beverage container, and when in the relatively extended position, the second holding member by its extension into at least one of the two parts of the compartment, with a plane of rotation of the second holding member lying in a plane generally parallel to the plane of the opening across the top, defines a second container opening smaller than the first container opening, the second container opening adapted to hold a smaller beverage container that is smaller relative to the relatively large beverage container.

24. A beverage container holder for a vehicle comprising:

a beverage container holding unit having a floor and generally upstanding walls defining a compartment with a rectangular opening on its top;

a first holding member which extends across the opening of the beverage container holding unit and divides the opening into two parts;

a second holding member which is mounted to the first holding member and moveable between a relatively retracted position and a relatively extended position, the second holding member when in the relatively retracted position defines a first container opening adapted to hold a relatively large beverage container, and when in the relatively extended position, defines a second container opening smaller than the first container opening, the second container opening adapted to hold a relatively small beverage container that is small relative to the relatively large beverage container; and wherein the second holding member is pivotally mounted to the first holding member so as to be rotatable about an axis generally perpendicular to a lower surface of the first holding member.

25. A beverage container holder for a vehicle comprising:

a beverage container holding unit having a floor and generally upstanding walls defining a compartment with a rectangular opening on its top;

a first holding member which extends across the opening of the beverage container holding unit and divides the compartment into two parts;

a second holding member which is mounted to the first holding member and moveable between a relatively retracted position and a relatively extended position, wherein when in the relatively retracted position, the second holding member defines a first container opening adapted to hold a relatively large beverage container, and when in the relatively extended position, the second holding member defines a second container opening smaller than the first container opening, the second container opening adapted to hold a relatively small beverage container that is small relative to the relatively large beverage container; and wherein a center of curvature of at least one of the second arcuate edges of the second holding member is laterally offset from a longitudinal axis of the beverage container holding unit when the second holding member is in the relatively extended position so that the relatively small beverage container can be stably held in a corner of the beverage container holding unit.

* * * * *